United States Patent
Tanaka et al.

(10) Patent No.: US 6,923,576 B2
(45) Date of Patent: Aug. 2, 2005

(54) ROLLING BEARING AND BELT CONTINUOUSLY VARIABLE TRANSMISSION

(75) Inventors: Susumu Tanaka, Kanagawa (JP); Shinji Fujita, Kanagawa (JP); Hideyuki Uyama, Kanagawa (JP); Nobuaki Mitamura, Kanagawa (JP)

(73) Assignee: NSK Ltd., Tokyo (JP)

( * ) Notice: Subject to any disclaimer, the term of this patent is extended or adjusted under 35 U.S.C. 154(b) by 153 days.

(21) Appl. No.: 10/414,308

(22) Filed: Apr. 16, 2003

(65) Prior Publication Data
US 2004/0005103 A1 Jan. 8, 2004

(30) Foreign Application Priority Data

Apr. 23, 2002 (JP) .................................. P. 2002-121078
May 28, 2002 (JP) .................................. P. 2002-153938

(51) Int. Cl.$^7$ .............................................. F16C 33/62
(52) U.S. Cl. ..................... 384/516; 384/492; 384/913
(58) Field of Search ........................... 384/450, 492, 384/516, 513, 912, 913, 625

(56) References Cited

U.S. PATENT DOCUMENTS

| | | | | |
|---|---|---|---|---|
| 6,248,186 B1 | * | 6/2001 | Yamamura et al. | 384/912 |
| 6,267,511 B1 | * | 7/2001 | Takemura et al. | 384/492 |
| 6,333,001 B1 | * | 12/2001 | Leppanen et al. | 384/492 |
| 6,342,109 B1 | * | 1/2002 | Takemura et al. | 384/913 |
| 6,357,924 B1 | * | 3/2002 | Takemura et al. | 384/492 |
| 6,565,677 B1 | * | 5/2003 | Takemura et al. | 384/492 |
| 6,793,397 B2 | * | 9/2004 | Ishiguro et al. | 384/450 |

FOREIGN PATENT DOCUMENTS

| | | |
|---|---|---|
| JP | 8-30526 B2 | 3/1996 |
| JP | 10-292859 A | 4/1998 |

* cited by examiner

Primary Examiner—Thomas R. Hannon
(74) Attorney, Agent, or Firm—Sughrue Mion, PLLC

(57) ABSTRACT

A rolling bearing has the radius of curvature of the raceway on an inner ring and an outer ring is from not smaller than 50.1% to not greater than 51.9% of the diameter of the balls, and at least one of the compositions of the bearing is obtained by forming an alloy steel having a carbon (C) content of from not smaller than 0.50% to not greater than 0.90%, a chromium (Cr) content of from not smaller than 3.0% to not greater than 15.0%, a manganese (Mn) content of from not smaller than 0.10% to not greater than 2.0%, a silicon (Si) content of from not smaller than 0.10% to not greater than 2.0%, a molybdenum (Mo) content of zero or not greater than 2.0% by weight, and a vanadium (V) content of zero or not greater than 2.0%, by weight.

10 Claims, 6 Drawing Sheets

ROLLING BEARING AND BELT CONTINUOUSLY VARIABLE TRANSMISSION

BACKGROUND OF THE INVENTION

1. Field of the Invention

The present invention relates to a rolling bearing for bearing a pulley shaft of a belt continuously variable transmission for a vehicle.

2. Description of the Related Art

A belt continuously variable transmission for vehicle has a mechanism for continuously changing the radius of belt-driven pulley as a variable speed mechanism for automatic transmission. For example, as shown in FIG. 6, an input shaft (drive shaft) 5 and an output shaft (driven shaft) 6 which are disposed in parallel to each other are provided with pulleys 7 and 8, respectively. A metallic belt 9 is wound round these pulleys. This belt 9 comprises two lines of ring composed of a laminate of about 10 sheets of thin plates having a thickness of about 0.2 mm and a number of thin friction pieces 92 (having a thickness of about 2 mm) attached thereto. The pushing force developed when these friction pieces 92 push each other causes the power to be transmitted.

A driving force is transmitted from the input shaft pulley (primary pulley) to the output shaft pulley (secondary pulley) 8 via this belt 9. Both the pulleys 7, 8 are composed of fixed conical plates 71, 81 fixed to the shafts 5, 6 and movable conical plates 72, 82 capable of moving in the axial direction by a hydraulic mechanism, respectively. The two conical plates form a V-shaped pulley groove.

By moving the movable plates 72, 82 of the pulleys 7, 8 in the axial direction to change the width of the groove and changing the position at which the belt 9 comes in contact with the pulleys 7, 8, the gear ratio can be continuously changed. For example, by reducing the width of the groove of the input shaft pulley while increasing the width of the output shaft pulley, the effective radius of rotation of the input shaft pulley is reduced while the effective radius of rotation of the output shaft pulley is increased, obtaining a great gear ratio.

Shafts (pulley shaft) 71a, 81a integrated to the fixed conical plates 71, 81 of the pulleys 7, 8 are born by radial ball bearings 11, 12, respectively. These pulley shafts 71a, 81a are each subject to thrust load as a reaction force when they transmit the shaft output to the following stage. Therefore, it is necessary to prevent the radial ball bearings 11, 12 from being dislocated in the axial direction by this thrust load to cause the center thereof to deviate from the input shaft pulley to the output shaft pulley (so-called "center dislocation"). As the aforementioned center dislocation increases, the belt 9 meanders to cause the ring 91 and the friction piece 92 to make inappropriate contact with each other occasionally to damage. Alternatively, the ball bearings 11, 12 can undergo slippage to generate a large amount of heat.

As a measure against this problem, JP-B-8-30526 proposes that a ball bearing for bearing a pulley shaft be provided with a ratio (R/D) of radius (R) of curvature of inner and outer ring raceways to ball diameter (D) of smaller than an ordinary standard predetermined value (0.53) (50.1 to 50.9% for inner ring and 50.1 to 51.9% for outer ring). The smaller this ratio (R/D) is, the more difficultly can move the ball bearing in the axial direction under thrust load and hence the more difficultly can occur center dislocation between the pulleys.

JP-A-10-292859 proposes the use of a four-point contact ball bearing having retained austenite in the inner ring and balls in an amount of not greater than 5%. In some detail, by predetermining the retained austenite content to not greater than 5%, the dimensional change due to the decomposition of retained austenite during heat generation is lessened.

On the other hand, as a lubricant for belt continuously variable transmission, a traction oil (lubricant containing a special abrasion adjustor having a traction coefficient of not smaller than 0.09 and a viscosity of not smaller than 30.8 cst ($30.8 \times 10^{-5}$ m$^2$/s) at 40° C.) is applied to the aforementioned ball bearing for bearing pulley shaft as well to allow torque converter, gear mechanism, hydraulic mechanism, wet clutch, etc. to operate smoothly for power transmission.

When the ratio (R/D) is reduced as in JP-B-8-30526, the contact area of the raceway with the balls increases, and the surface pressure is reduced. Thus, it can be expected that the bearing life is prolonged.

However, it was found that a radial ball bearing lubricated with a traction oil can difficultly be provided with an expected prolonged life merely by reducing the surface pressure. This is presumably because the lubricant is exfoliated in different manners from traction oil to mineral oil.

In other words, in the case where the lubricant is a mineral oil, the starting point of flaking is located at the center of the width of the raceway as shown in FIG. 7A. On the contrary, in the case where the lubricant is a traction oil, the starting point of flaking is mostly located at a site apart from the center of the width of the raceway as shown in FIG. 7B. Since the difference V in rotary speed between the raceway and the balls is a great factor, it is thought that the bearing life is somewhat affected not only by the surface pressure developed by the raceway and the balls but also by the difference V in rotary speed. Further, the reduction of ratio (R/D) leads to ease of the balls in coming in contact with sites apart from the center of the width of the raceway.

Accordingly, a radial ball bearing for bearing the pulley shaft of a belt continuously variable transmission cannot accomplish both the reduction of center dislocation between the two pulleys and the prolongation of bearing life merely by reducing the aforementioned ratio (R/D).

In addition to this, the short life of rolling bearings for bearing the rotary shaft of pulley of belt continuously variable transmission is presumably attributed to the following mechanism.

In some detail, the rolling bearing for the aforementioned purpose undergoes not only the aforementioned slippage with center dislocation between pulleys but also slippage and vibration due to stick slip friction that occurs on the metallic belt wound round the pulleys. Thus, the lubricant film can be more easily exfoliated. As a result, this bearing is subject to heat generation and surface fatigue due to metallic contact and production of newly produced surface. The newly produced surface then acts as a catalyst to allow hydrocarbons or water content in the lubricant to be decomposed to hydrogen that specifically causes early flaking.

SUMMARY OF THE INVENTION

The present invention has been worked out to solve these problems with the related art technique. An aim of the present invention is to provide a radial ball bearing for bearing the pulley shaft of a belt continuously variable transmission which can attain a prolonged bearing life while lessening center dislocation between the two pulleys round which the belt is wound.

In order to accomplish the aforementioned aim, the present invention provides a rolling bearing has an inner ring, an outer ring, a plurality of balls as rolling elements rollably interposed between the inner ring and the outer ring, wherein the radius of curvature of the raceway on the inner ring and the outer ring is from not smaller than 50.1% to not greater than 51.9% of the diameter of the balls, and at least one of the inner ring, the outer ring and the rolling elements is obtained by forming an alloy steel having, a carbon (C) content of from not smaller than 0.50% by weight to not greater than 0.90% by weight, a chromium (Cr) content of from not smaller than 3.0% by weight to not greater than 15.0% by weight, a manganese (Mn) content of from not smaller than 0.10% by weight to not greater than 2.0% by weight, a silicon (Si) content of from not smaller than 0.10% by weight to not greater than 2.0% by weight, a molybdenum (Mo) content of zero or not greater than 2.0% by weight; and a vanadium (V) content of zero or not greater than 2.0% by weight, into a predetermined shape, and then subjecting the alloy steel to form hardening and tempering.

The rolling bearing of the present invention can be provided with a prolonged bearing life as compared with rolling bearings formed by the conventional alloy steel (bearing steel such as SUJ2, case hardening steel such as SCR420 and SCM420) even when lubricated with a traction oil and the radius (R) of curvature of the raceway on the inner ring and the outer ring is from not smaller than 50.1% to not greater than 51.9% of the diameter (D) of the balls (rolling elements) by forming at least one of the inner ring, the outer ring and the rolling elements formed by the aforementioned alloy steel.

The critical significance of the limitation of numeral value of various components of alloy steel will be described below.

[Carbon (C) Content: from Not Smaller than 0.50% by Weight to Not Greater than 0.90% by Weight]

C is an element which undergoes solid solution in a matrix to provide the steel with hardness and is bonded to elements such as Cr, Mo, V and W to form a carbide that renders the steel resistant to abrasion. In order to secure hardness and abrasion resistance required for rolling bearing after heat treatment, it is necessary that C is incorporated in an amount of not smaller than 0.50% by weight.

When C is incorporated in an amount of greater than 0.90% by weight, coarse eutectic carbides can be easily produced during steel making, occasionally providing the bearing with drastically deteriorated rolling fatigue life or mechanical strength. Further, cold-workability and turnability are deteriorated, adding to work cost.

C content is preferably from not smaller than 0.55% to not greater than 0.80%.

[Chromium (Cr) Content: from Not Smaller than 3.0% by Weight to Not Greater than 15.0% by Weight]

Cr is an element which undergoes solid solution in a matrix to enhance the hardenability, resistance to temper softening, corrosion resistance and other properties thereof and form finely divided carbides that prevent the growth of crystalline particles during heat treatment to prolong the rolling fatigue life or enhance the abrasion resistance or heat resistance of the matrix. Cr is also an element which stabilizes the texture to enhance the dimensional stability of the matrix and drastically inhibit the drop of life due to penetration of hydrogen. When the content of Cr falls below than 3.0% by weight, these effects cannot be sufficiently exerted.

When the content of Cr exceeds 15.0% by weight, coarse eutectic carbides can be easily produced during steel making, occasionally providing the bearing with drastically deteriorated rolling fatigue life or mechanical strength. Further, cold-workability and turnability are deteriorated, adding to work cost.

The content of Cr is preferably from not smaller than 4.0% by weight to not greater than 13.5% by weight and more preferably is from not smaller than 4.0% by weight to not greater than 9.0% by weight.

Mn is an element which acts as a deoxidizer during steel making. Mn also undergoes solid solution in a matrix to enhance the hardenability similarly to Cr. When the content of Mn falls below 0.10% by weight, these effects cannot be substantially exerted.

When the content of Mn exceeds 2.0% by weight, it is not only to cause the deterioration of cold-workability and turnability but also the drop of martensite transformation starting temperature that occasionally makes it impossible to provide a sufficient hardness.

The content of Mn is preferably from not smaller than 0.10% by weight to not greater than 1.5% by weight.

[Silicon (Si) Content in Alloy Steel: from Not Smaller than 0.10% by Weight to Not Greater than 2.0% by Weight]

Si is an element which acts as a deoxidizer during steel making similarly to Mn. Si also undergoes solid solution in a matrix to enhance the hardenability thereof similarly to Cr and Mn. Si is also an element useful for strengthening martensite in the matrix to prolong the bearing life. Si further has an effect of enhancing the temper softening resistance, dimensional stability and heat resistance of the matrix. When the content of Si falls below 0.10% by weight, these effects cannot be substantially exerted.

When the content of Si exceeds 2.0% by weight, the cold-workability, turnability and forgeability of the matrix can be deteriorated.

The content of Si is preferably from not smaller than 0.10% by weight to not greater than 1.5% by weight.

[Molybdenum (Mo) Content in Alloy Steel: from Not Smaller than 0% by Weight to Not Greater than 2.0% by Weight]

Mo is an element which undergoes solid solution in a matrix to enhance the hardenability, resistance to temper softening, corrosion resistance and other properties thereof and form finely divided carbides that prevent the growth of crystalline particles during heat treatment to prolong the rolling fatigue life or enhance the abrasion resistance or abrasion resistance of the matrix similarly to Cr. Mo is also an element which stabilizes the texture to enhance the dimensional stability of the matrix and drastically inhibit the drop of life due to penetration of hydrogen.

When the content of Mo exceeds 2.0% by weight, coarse eutectic carbides can be easily produced during steel making, occasionally providing the bearing with drastically deteriorated rolling fatigue life or mechanical strength. Further, cold-workability and turnability are deteriorated, adding to work cost.

Mo is not an essential component of the alloy steel to be used in the present invention.

[Vanadium (V) Content in Alloy Steel: from Not Smaller than 0% by Weight to Not Greater than 2.0% by Weight]

V is an element which can easily produce carbides or nitrides. The presence of these carbides or nitrides causes remarkable enhancement of mechanical strength, abrasion resistance and heat resistance of the matrix. V is also an element which stabilizes the texture to enhance the dimensional stability of the matrix and drastically inhibit the drop of life due to penetration of hydrogen.

When the content of V exceeds 2.0% by weight, coarse eutectic carbides can be easily produced during steel making, occasionally providing the bearing with drastically deteriorated rolling fatigue life or mechanical strength. Further, cold-workability and turnability are deteriorated, adding to work cost.

V is not an essential component of the alloy steel to be used in the present invention.

The present invention also provides a rolling bearing (radial ball bearing) for use in the purpose of bearing the rotary shaft of a pulley round which the belt of a belt continuously variable transmission is wound wherein at least one of the inner ring, the outer ring and the rolling elements is formed by the aforementioned specific alloy steel, as the rolling elements there are provided balls, and the radius (R) of curvature of the raceway on the inner ring and the outer ring is from not smaller than 50.1% to not greater than 51.9% of the diameter of the balls.

In accordance with this radial ball bearing, the ratio (R/D) is reduced to the same range as disclosed in JP-B-8-30526 to provide a structure such that the ball bearing can difficultly slide in the axial direction under some thrust load, causing little center dislocation between pulleys. Further, since the aforementioned specific alloy steel is used, the bearing life can be prolonged as compared with the case where the conventional alloy steels (bearing steel such as SUJ2, case hardening steel such as SCR420 and SCM420) even when lubricated with a traction oil.

In other words, this radial ball bearing is provided with a reduced R/D ratio that reduces center dislocation between pulleys and is formed by the aforementioned specific alloy steel to prolong its life. In this arrangement, the radial ball bearing for supporting the pulley shaft of a belt continuously variable transmission can exhibit a prolonged bearing life while lessening center dislocation between the both pulleys round which a belt is wound.

In the rolling bearing of the present invention, the aforementioned alloy steel preferably has a chromium equivalent of from not smaller than 3.5 to not greater than 16.0 as represented by the following equation (1) and the content of retained austenite in the surface portion thereof after hardening and tempering is from not smaller than 6% by volume to not greater than 25% by volume:

$$\text{Chromium equivalent} = [Cr] + 2[Si] + 1.5[Mo] + 5[V] \quad (1)$$

wherein [M] represents the content (% by weight) of the element M.

By thus predetermining the amount of retained austenite in the surface portion of the inner ring, the outer ring and the rolling elements to a range of from not smaller than 6% by volume to not greater than 25% by volume, surface fatigue can difficultly occur, prolonging the bearing life, even when foreign matters enter in the gap between the inner ring and outer ring and the rolling elements or slippage occurs across the inner ring and outer ring and the rolling elements.

When the chromium equivalent falls below 3.5, sufficient dimensional stability cannot be obtained while securing the retained austenite content of from not smaller than 6% by volume to not greater than 25% by volume. Further, since the rise of Cr, Si, Mo and V contents causes remarkable deterioration of rolling fatigue or mechanical strength or adds to work cost as previously mentioned, the upper limit of chromium equivalent is predetermined to be 16.0. The chromium equivalent is preferably from 5.0 to 16.0, more preferably from 7.0 to 14.0.

The present invention further provides a belt continuously variable transmission comprising the rolling bearing of the present invention by which the rotary shaft of a pulley round which a belt is wound is born.

In order to accomplish the aforementioned aim, the present invention provides a rolling bearing has an inner ring, an outer ring, and a plurality of rolling elements rollably interposed between the inner ring and the outer ring, wherein at least one of the inner ring, the outer ring and the rolling elements is obtained by forming an alloy steel having, a carbon (C) content of from not smaller than 0.10% by weight to not greater than 0.90% by weight, a chromium (Cr) content of from not smaller than 3.0% by weight to not greater than 8.0% by weight, a manganese (Mn) content of from not smaller than 0.10% by weight to not greater than 2.0% by weight, and a silicon (Si) content of from not smaller than 0.10% by weight to not greater than 1.0% by weight into a predetermined shape, and then subjecting the alloy steel to form carburizing or carbonitriding, hardening and tempering, the total content of carbon and nitrogen in the raceway surface of the ring and/or the rolling surface of the rolling element is from not smaller than 1.20% by weight to not greater than 2.50% by weight, the content of retained austenite in the raceway surface and/or the rolling surface is from not smaller than 15% by volume to not greater than 40% by volume, and the hardness of the raceway surface and/or the rolling surface is from not smaller than 59 to not greater than 64 as calculated in terms of Rockwell C hardness (HRC).

[C+N], retained $\gamma$ and surface hardness of the aforementioned raceway, etc. represent values on the raceway surface of the ring and the rolling surface of the finished product which has been subjected to grinding.

An embodiment of the rolling bearing of the present invention is the rolling bearing as defined above wherein as the rolling elements there are provided balls and the radius of curvature of the raceway on the inner ring and the outer ring is from not smaller than 50.1% to not greater than 51.9% (preferably from not smaller than 51.0% to not greater than 51.9%) of the diameter of the balls.

The rolling bearing of the present invention can be provided with a prolonged bearing life as compared with rolling bearings formed by the conventional alloy steel (bearing steel such as SUJ2, case hardening steel such as SCR420 and SCM420) even when lubricated with a traction oil and the radius (R) of curvature of the raceway on the inner ring and the outer ring is from not smaller than 50.1% to not greater than 51.9% of the diameter of the balls (rolling elements) by forming at least one of the inner ring, the outer ring and the rolling elements formed by the aforementioned alloy steel and predetermining [C+N], retained $\gamma$ and surface hardness of the raceway, etc. to the aforementioned range.

The critical significance of the limitation of numeral value of various components of alloy steel will be described below.

[Carbon (C) Content: from Not Smaller than 0.10% by Weight to Not Greater than 0.90% by Weight]

C is an element which undergoes solid solution in a matrix to provide the steel with hardness and is bonded to elements such as Cr, Mo, V and W to form a carbide that renders the steel resistant to abrasion. In order to secure hardness and abrasion resistance required for rolling bearing after heat treatment, it is necessary that C be incorporated in an amount of not smaller than 0.10% by weight. In order to reduce the carburizing and carbonitriding time and hence inhibit the cost rise, the carbon content is preferably not smaller than 0.50%.

When C is incorporated in an amount of greater than 0.90% by weight, coarse eutectic carbides can be easily produced during steel making, occasionally providing the bearing with drastically deteriorated rolling fatigue life or mechanical strength. Further, cold-workability and turnability are deteriorated, adding to work cost.

C content is preferably from not smaller than 0.55% to not greater than 0.80%.

[Chromium (Cr) Content: from Not Smaller than 3.0% by Weight to Not Greater than 8.0% by Weight]

Cr is an element which undergoes solid solution in a matrix to enhance the hardenability, resistance to temper softening, corrosion resistance and other properties thereof and form finely divided carbides that prevent the growth of crystalline particles during heat treatment to prolong the rolling fatigue life or enhance the abrasion resistance or heat resistance of the matrix. Cr is also an element which stabilizes the texture to enhance the dimensional stability of the matrix and drastically inhibit the drop of life due to penetration of hydrogen. When the content of Cr falls below than 3.0% by weight, these effects cannot be sufficiently exerted.

When the content of Cr is too great, coarse eutectic carbides can be easily produced during steel making, occasionally providing the bearing with drastically deteriorated rolling fatigue life or mechanical strength. Further, cold-workability and turnability are deteriorated, adding to work cost. In particular, when the content of Cr exceeds 8.0%, the resulting alloy steel can be difficultly subjected to carburizing and carbonitriding.

The content of Cr is preferably from not smaller than 4.0% by weight to not greater than 7.0% by weight.

[Manganese (Mn) Content: from Not Smaller than 0.10% by Weight to Not Greater than 2.0% by Weight]

Mn is an element which acts as a deoxidizer during steel making. Mn also undergoes solid solution in a matrix to enhance the hardenability similarly to Cr. When the content of Mn falls below 0.10% by weight, these effects cannot be substantially exerted.

When the content of Mn exceeds 2.0% by weight, it is not only to cause the deterioration of cold-workability and turnability but also the drop of martensite transformation starting temperature that occasionally makes it impossible to provide a sufficient hardness.

The content of Mn is preferably from not smaller than 0.10% by weight to not greater than 1.5% by weight.

[Silicon (Si) Content in Alloy Steel: from Not Smaller than 0.10% by Weight to Not Greater than 1.0% by Weight]

Si is an element which acts as a deoxidizer during steel making similarly to Mn. Si also undergoes solid solution in a matrix to enhance the hardenability thereof similarly to Cr and Mn. Si is also an element useful for strengthening martensite in the matrix to prolong the bearing life. Si further has an effect of enhancing the temper softening resistance, dimensional stability and heat resistance of the matrix. When the content of Si falls below 0.10% by weight, these effects cannot be substantially exerted.

When the content of Si exceeds 1.0% by weight, the cold-workability, turnability and forgeability of the matrix can be deteriorated.

The content of Si is preferably from not smaller than 0.10% by weight to not greater than 0.50% by weight.

[Other Alloy Components and Unavoidable Impurities of Alloy Steel]

Oxygen (O) contained in an alloy steel produces an oxide-based inclusion which causes the deterioration of bearing life. Titanium (Ti) contained in an alloy steel produces a titanium-based inclusion which causes the deterioration of bearing life. Therefore, the content of O is preferably not greater than 10 ppm, and the content of Ti is preferably not greater than 20 ppm.

[[C+N] of Raceway, Etc.: from Not Smaller than 1.20% by Weight to Not Greater than 2.50% by Weight]

When [C+N] of the raceway, etc., i.e. the total content of carbon and nitrogen in the raceway surface of the ring (inner ring and/or outer ring) and/or the rolling surface of the rolling elements falls below 1.20% by weight, surface fatigue can be difficultly lessened while securing sufficient rolling life and heat resistance. Further, when [C+N] exceeds 2.50% by weight, carbides on the grain boundary grow to a size of not smaller than 10 $\mu$m or in network, occasionally deteriorating the rolling life.

The content of nitrogen in the raceway surface of the ring is preferably not smaller than 0.10% by weight because some of the carbon atoms can be replaced by nitrogen atoms to eliminate the growth of carbides to coarse particles. However, when the content of nitrogen exceeds 0.30% by weight, the grindability, etc. of the product is remarkably deteriorated, adding to cost. In other words, the content of nitrogen in the raceway surface of the ring is preferably from not smaller than 0.10% by weight to not greater than 0.30% by weight.

[Content of Retained Austenite in the Raceway Surface of the Ring, Etc.: from Not Smaller than 15% by Volume to Not Greater than 40% by Volume]

Retained austenite has an effect of remarkably lessening surface fatigue. However, when a rolling bearing for bearing the rotary shaft of the pulley of a belt continuously variable transmission has a retained austenite content of less than 15% by volume, this effect cannot be sufficiently obtained. The content of retained austenite in the raceway surface of the ring, etc. is preferably not smaller than 20% by volume.

When the content of retained austenite in the raceway surface of the ring, etc. exceeds 40% by volume, the resulting alloy steel exhibits a lowered surface hardness or undergoes deformation of bearing ring during assembly. The content of retained austenite in the raceway surface of the ring, etc. is preferably not smaller than 35% by volume.

[Surface Hardness of Raceway, Etc.: from 59 to 64 as Calculated in Terms of HRC]

When the surface hardness of the raceway, etc. (surface of raceway and/or rolling surface) falls below 59 as calculated in terms of Rockwell C hardness (HRC), abrasion resistance or surface fatigue cannot be sufficiently lessened. The surface hardness of the raceway, etc. is preferably not smaller than 61 as calculated in terms of HRC. The upper limit of surface hardness is predetermined to 64 taking into account toughness.

The present invention also provides a rolling bearing (radial ball bearing) for use in the purpose of bearing the rotary shaft of pulley round which the belt of a belt continuously variable transmission is wound wherein at least one of the inner ring, the outer ring and the rolling elements is obtained by forming the aforementioned specific alloy steel into a predetermined shape, and then subjecting the alloy steel thus formed to carburizing or carbonitriding, hardening and tempering, the total content of carbon and nitrogen in the raceway surface of the ring and/or the rolling surface of the rolling element is from not smaller than 1.20% by weight to not greater than 2.50% by weight, the content of retained austenite in the raceway surface of the ring and/or the rolling surface is from not smaller than 15% by volume to not greater than 40% by volume, the hardness of the raceway surface of the ring and/or the rolling surface is from not smaller than 59 to not greater than 64 as calculated in terms of Rockwell C hardness (HRC), as the rolling elements there are provided balls and the radius of curvature of the raceway on the inner ring and the outer ring is from not smaller than 50.1% to not greater than 51.9% of the diameter of the balls.

In accordance with this radial ball bearing, the ratio (R/D) is reduced to the same range as disclosed in JP-B-8-30526 to provide a structure such that the ball bearing can difficultly slide in the axial direction under some thrust load, causing little center dislocation between pulleys. Further, since the aforementioned specific alloy steel is used and [C+N], retained γ and surface hardness of the raceway, etc. are predetermined to the aforementioned range, the bearing life can be prolonged as compared with the case where the conventional alloy steels (bearing steel such as SUJ2, case hardening steel such as SCR420 and SCM420) even when lubricated with a traction oil.

In other words, this radial ball bearing is provided with a reduced R/D ratio that reduces center dislocation between pulleys and is formed by the aforementioned specific alloy steel and is provided with [C+N], retained γ and surface hardness of raceway predetermined to the aforementioned range to prolong its life. In this arrangement, the radial ball bearing for supporting the pulley shaft of a belt continuously variable transmission can exhibit a prolonged bearing life while lessening center dislocation between the both pulleys round which a belt is wound.

The present invention further provides a belt continuously variable transmission comprising the rolling bearing of the present invention by which the rotary shaft of a pulley round which a belt is wound is born.

DETAILED DESCRIPTION OF THE PREFERRED EMBODIMENTS

Embodiments of implementation of the present invention will be described hereinafter.

TABLE 1

| Material No. | Alloying component (wt-%) | | | | | Cr equivalent |
|---|---|---|---|---|---|---|
| | C | Si | Mn | Cr | Mo | V | |
| A-1 | 0.50 | 0.25 | 1.03 | 3.05 | | | 3.55 |
| A-2 | 0.90 | 0.52 | 0.51 | 4.98 | | | 6.02 |
| A-3 | 0.70 | 0.98 | 0.46 | 5.02 | | | 6.98 |
| A-4 | 0.65 | 0.97 | 0.78 | 7.01 | | | 8.95 |
| A-5 | 0.68 | 0.99 | 0.55 | 4.01 | 1.99 | | 8.975 |
| A-6 | 0.67 | 0.99 | 0.49 | 3.99 | | 1.03 | 11.12 |
| A-7 | 0.72 | 0.53 | 1.05 | 5.01 | 0.55 | | 6.895 |
| A-8 | 0.71 | 1.02 | 0.51 | 8.97 | | | 11.01 |
| A-9 | 0.69 | 0.54 | 0.78 | 12.99 | | | 14.07 |
| A-10 | 0.58 | 0.51 | 0.48 | 14.90 | | | 15.92 |
| B-1 | 1.01 | 0.25 | 0.31 | 1.47 | | | 1.97 |
| B-2 | 0.81 | 0.31 | 0.46 | 1.99 | | | 2.61 |
| B-3 | 0.40 | 0.51 | 0.55 | 5.01 | | | 6.03 |
| B-4 | 0.99 | 0.33 | 0.31 | 7.00 | | | 7.66 |
| B-5 | 0.71 | 0.34 | 0.35 | 16.01 | | | 16.69 |

Firstly, alloy steels A-1 to A-10 and B-1 to B-5 comprising alloying components having the formulation set forth Table 1 above were prepared. Table 1 also shows Cr equivalent of the various alloy steels. In Table 1, those having an alloying component content falling outside the range defined in Claim 1 or Cr equivalent falling outside the range defined in Claim 2 are underlined.

Figure 1:
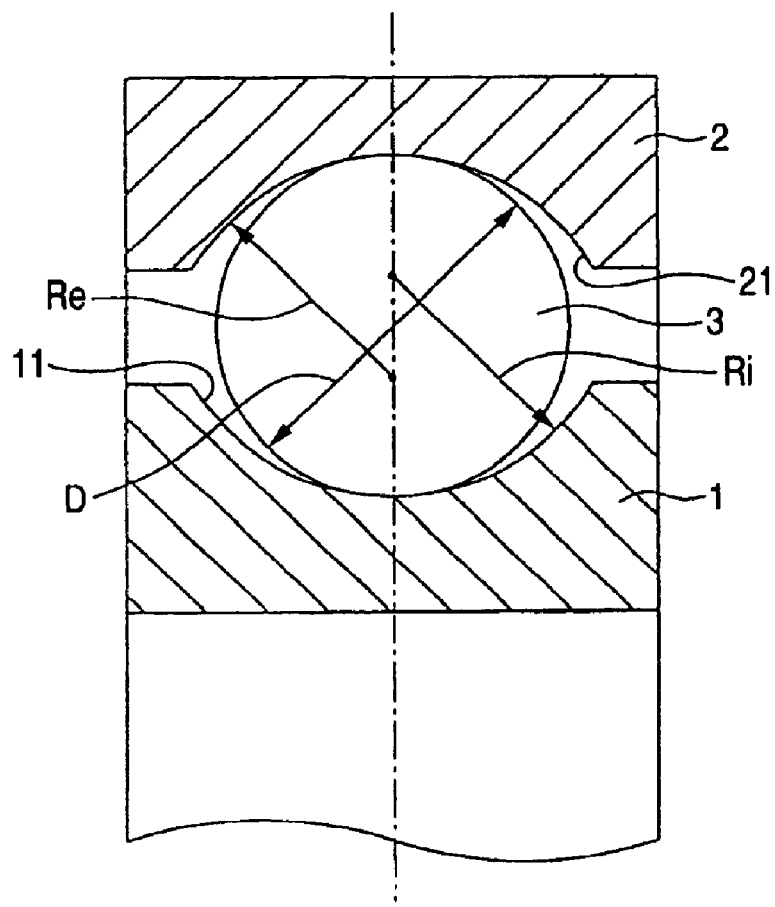
FIG. 1 is a diagram illustrating the structure of a rolling bearing and the radius of curvature of the raceway of inner and outer rings.

These alloy steels were each used to prepare an inner ring and an outer ring for radial ball bearing (inner diameter: 40 mm; outer diameter: 80 mm; width: 18 mm) having a nominal count of 6208. During this procedure, the radius Ri of curvature of the raceway 11 of the inner ring 1 and the radius Re of curvature of the raceway 21 of the outer ring 2 shown in FIG. 1 were each determined to various values. The various alloy steels were each formed into a predetermined shape, and then subjected to hardening at a temperature of from 840° C. to 1,050° C. and tempering at a temperature of 160° C. The alloy steels which had been subjected to heat treatment were each then subjected to grinding and superfinish. The surface roughness of the raceways 11, 21 were each determined to a range of from 0.01 to 0.04 μmRa.

Separately, balls 3 having a diameter (D) of 11.906 mm made of steel corresponding to grade 20 of SUJ2 were prepared. These balls 3 had been subjected to carbonitriding. These balls 3, the aforementioned inner ring 1, the outer ring 2 and a corrugated press retainer made of metal (not shown in FIG. 1) were then assembled into test bearings. The characteristics of the various test bearings, i.e., "material", "surface hardness of raceway", "residual γ (retained austenite content) of raceway", "radius (R) of curvature of raceway/diameter (D) of ball" of the inner ring 1 and the outer ring 2 are set forth in Table 2. The inner clearance in the radial is referred to as "C3 clearance".

10 samples were prepared for each of these test bearings. These samples were each mounted on a ball bearing life testing machine produced by NSK Ltd. These samples were each then subjected to life test by rotation under the following conditions.

Vibration was measured during rotation. When the amplitude of vibration of the bearing reached five times the initial amplitude of vibration, rotation was terminated. The rotation time thus reached was defined to be life. At this time, the bearing was examined for occurrence of flaking on the raceway of the inner and outer rings. In the case where the amplitude of vibration didn't reach five times the initial amplitude of vibration, testing was terminated when three times of 705 hours, which is the calculated life under these conditions, passed.

Subsequently, the results of test on 10 samples were plotted on a Weibull distribution graph (cumulative failure rate—life) for each of these test bearings. From this graph was then determined, beginning with those having short life, the total rotation time (L10 life) required until 10% of the samples of these test bearings underwent flaking. L10 life of the various test bearings were each then calculated relative to that of No. 25 as 1.

<Conditions of Life Test>
  Rotary speed: 3,000 rpm
  Radial load: 4,800 N
  Axial load: 2,000 N
  Lubricant: Mixture of a Type NS-1 lubricant for continuously variable transmission (produced by Showa Shell Sekiyu K.K.), which is classified as "traction oil" with 3% by volume of tap water
  Lubricant temperature: 130° C.
  Rotary ring: Inner ring Further, the various test bearings were each kept at 130° C. for 1,000 hours for high temperature retention test. The amount of dimensional change of outer diameter of the bearings from before to after testing was then measured.

Figure 3:
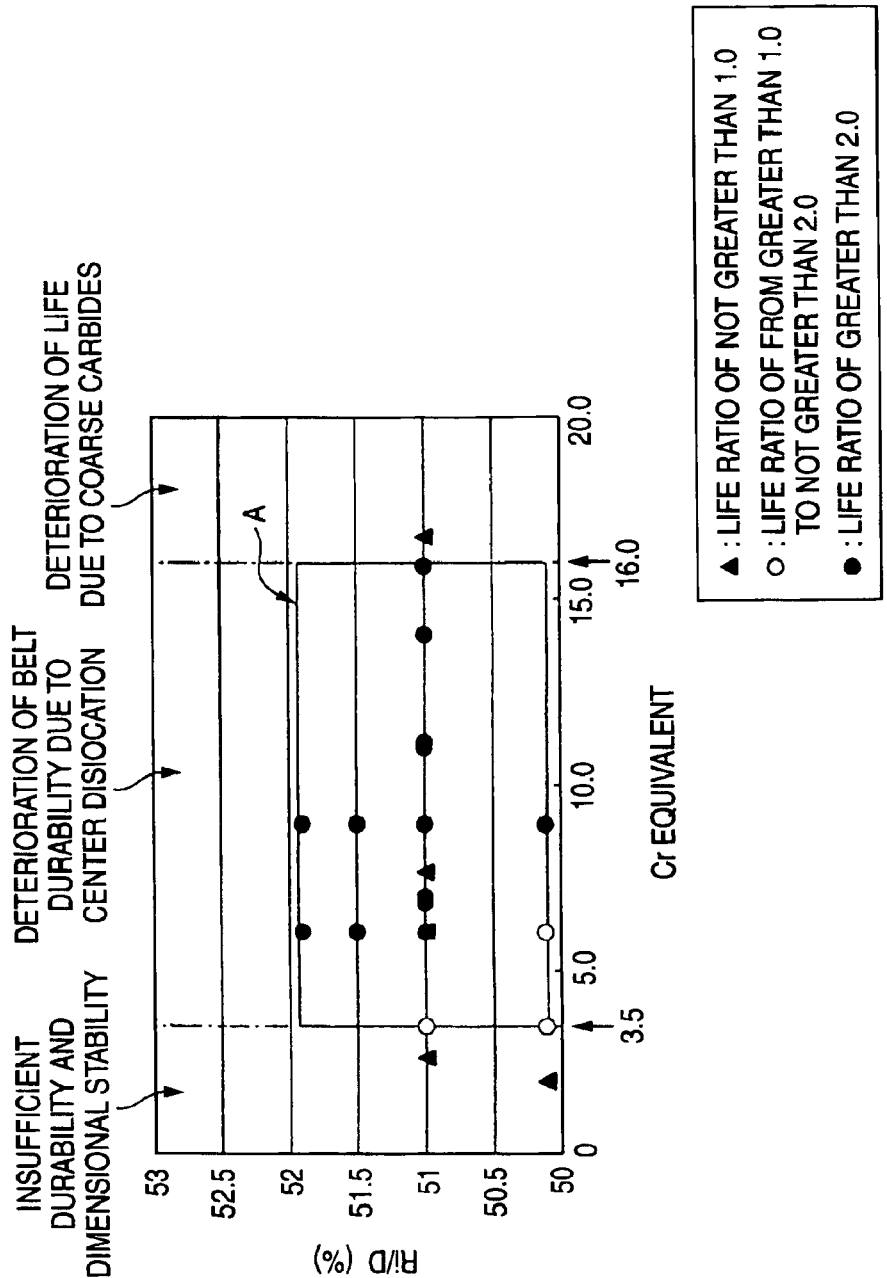
FIG. 3 is a graph illustrating the relationship between the chromium equivalent of alloy steels constituting the material and R/D of inner ring and life ratio (relative value of L10 life) obtained from the results of embodiment of implementation of the present invention.

The results of these tests are set forth in Table 2 below with the structure of the test bearings.

of inner ring and outer ring of which are 52.0% and 53.0%, respectively, are graphically illustrated in FIG. 3. In this graph, these plots are represented by "Δ" when the life ratio is not greater than 1.0, "○" when the life ratio is from greater than 1.0 to not greater than 2.0 and "●" when the life ratio is greater than 2.0.

In FIG. 3, the range A indicates a range in which both the two requirements for (R/D) of inner ring (from not smaller than 50.1% by weight to not greater than 51.9% by weight) and chromium equivalent (from not smaller than 3.5 to not greater than 16.0) are satisfied. There are two "Δ" plots in the range A, but they indicate test bearings comprising an alloy steel made of alloying components having the formulation falling outside the scope of the present invention.

As can be seen in these results, the test bearing Nos. 1 to 15 have R/D ratio of from not smaller than 50.1% by weight to not greater than 51.9% by weight both in the inner and outer rings but are made of the alloy steels A-1 to A-10, the alloying components of which fall within the scope of the present invention (requirement (1)) and have retained austenite in the raceway surface of the ring in an amount of from 6 to 25% by volume (requirement (2)) and a chromium equivalent of from 3.5 to 16.0 (requirement (3)). Thus, these test bearings can exhibit a prolonged bearing life when lubricated with a traction oil as compared with the test bearing Nos. 16 to 25, which don't satisfy any one of the aforementioned requirements (1) to (3).

TABLE 2

| | | Constitution of test bearing | | | Results of life test | | Dimensional |
| | | Surface | | | | | |
| | | hardness | retained γ | R/D (%) | | L10 life | Number of flaking | change at high |
| No. | Material | (Hv) | (vol-%) | Inner ring | Outer ring | (relative value) | Inner ring | Outer ring | temperature (μm) |
|---|---|---|---|---|---|---|---|---|---|
| 1 | A-1 | 682 | 8 | 50.1 | 51.0 | 1.1 | 8 | 1 | 7 |
| 2 | A-2 | 745 | 16 | 50.1 | 51.0 | 1.8 | 5 | 0 | ≧5 |
| 3 | A-2 | 745 | 16 | 51.0 | 51.0 | 2.2 | 0 | 3 | ≧5 |
| 4 | A-2 | 745 | 16 | 51.5 | 51.9 | 2.7 | 2 | 0 | ≧5 |
| 5 | A-3 | 738 | 12 | 51.0 | 51.0 | 2.7 | 0 | 1 | ≧5 |
| 6 | A-4 | 741 | 17 | 50.1 | 51.0 | 2.2 | 3 | 0 | ≧5 |
| 7 | A-4 | 741 | 17 | 51.0 | 51.5 | 3.0 | 0 | 0 | ≧5 |
| 8 | A-4 | 741 | 17 | 51.9 | 51.9 | 3.0 | 0 | 0 | ≧5 |
| 9 | A-5 | 735 | 14 | 51.0 | 51.0 | 3.0 | 0 | 0 | ≧5 |
| 10 | A-5 | 735 | 14 | 51.9 | 51.9 | 3.0 | 0 | 0 | ≧5 |
| 11 | A-6 | 733 | 10 | 51.0 | 51.9 | 3.0 | 0 | 0 | ≧5 |
| 12 | A-7 | 732 | 11 | 51.0 | 51.0 | 2.6 | 0 | 2 | ≧5 |
| 13 | A-8 | 719 | 19 | 51.0 | 51.0 | 3.0 | 0 | 0 | ≧5 |
| 14 | A-9 | 731 | 11 | 51.0 | 51.0 | 3.0 | 0 | 0 | ≧5 |
| 15 | A-10 | 689 | 25 | 51.0 | 51.0 | 2.8 | 2 | 0 | ≧5 |
| 16 | B-1 | 733 | 8 | 50.1 | 51.0 | 0.1 | 9 | 1 | 23 |
| 17 | B-1 | 733 | 8 | 51.0 | 51.0 | 0.3 | 2 | 8 | 23 |
| 18 | B-1 | 733 | 8 | 52.0 | 53.0 | 0.6 | 10 | 0 | 23 |
| 19 | B-2 | 741 | 12 | 51.0 | 51.0 | 0.5 | 1 | 9 | 17 |
| 20 | B-3 | 603 | 3 | 51.0 | 51.0 | 0.4 | 7 | 3 | ≧5 |
| 21 | B-4 | 734 | 16 | 51.0 | 51.0 | 0.2 | 8 | 2 | ≧5 |
| 22 | B-5 | 722 | 14 | 51.0 | 51.0 | 0.2 | 9 | 1 | ≧5 |
| 23 | A-2 | 703 | 5 | 50.1 | 51.0 | 1.2 | 10 | 0 | ≧5 |
| 24 | A-2 | 703 | 5 | 51.0 | 51.0 | 1.5 | 1 | 9 | ≧5 |
| 25 | A-10 | 621 | 34 | 51.0 | 51.0 | 1.0 | 6 | 4 | ≧5 |

Figure 2:
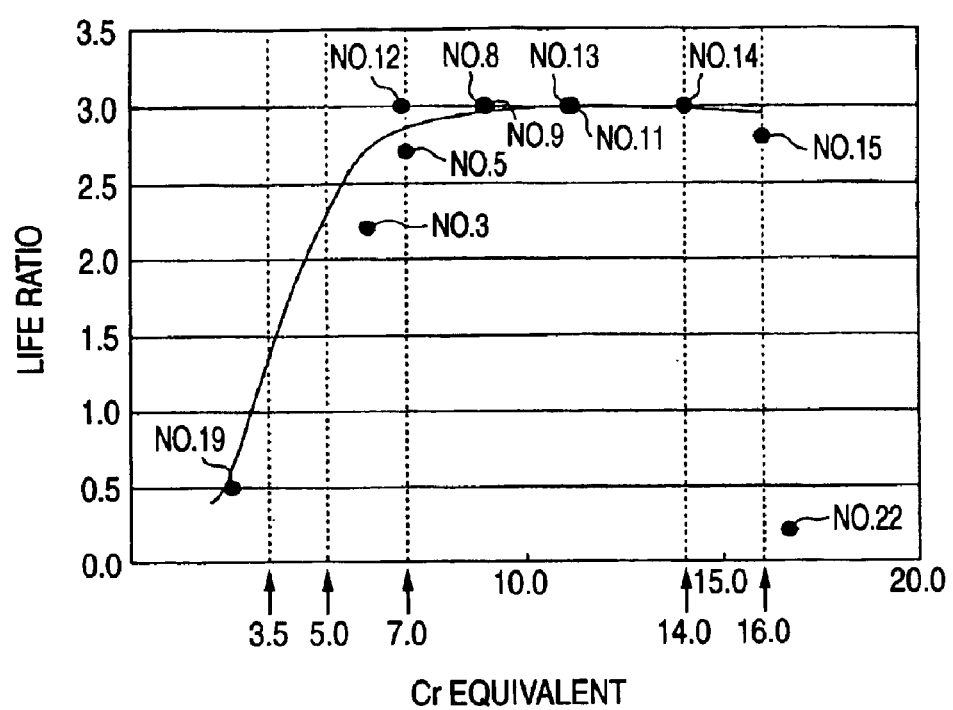
FIG. 2 is a graph illustrating the relationship between the chromium equivalent of alloy steels constituting the material and the life ratio (relative value of L10 life) obtained from the results of embodiment of implementation of the present invention.

The relationship between the chromium equivalent and the life ratio (relative value of L10 life) of the test bearings (Nos. 3, 5, 7, 9, 11 to 15, 19, 22) wherein R/D of the inner ring is 51.0%, the carbon content in the material used falls within the range defined herein and the retained γ (retained austenite content) in the raceway falls within the range of from 6% to 25% are graphically illustrated in FIG. 2.

The relationship between the chromium equivalent and R/D of inner ring of all the test bearings except No. 18, R/D In other words, the arrangement of the structures of the test bearing Nos. 1 to 15 can provide a radial ball bearing for bearing the pulley shaft of a belt continuously variable transmission which undergoes little surface fatigue even with slippage while lessening center dislocation between the two pulleys round which the belt is wound to attain a prolonged bearing life under lubrication with a traction oil.

In particular, the test bearing Nos. 2 to 15 exhibited good results, i.e., life ratio of not smaller than 1.8 and dimensional change of not greater than 5 μm at high temperatures because they were made of the alloy steels A-2 to A-10, which have a chromium equivalent of from not smaller than 5.0 to not greater than 16.0, respectively. On the other hand, the test bearing No. 1 exhibited a dimensional change of 7 μm at high temperatures because it was made of an alloy steel having a chromium equivalent as relatively low as 3.55. Further, the test bearing Nos. 16 to 19 exhibited a dimensional change as great as from 17 μm to 23 μm at high temperatures because they were made of alloy steels having a chromium equivalent as low as 1.97 and 2.61.

Moreover, the test bearing Nos. 7 to 11, 13 and 14 exhibited good results, i.e., life ratio of not smaller than 3.0 because they were made of the alloy steels A-4 to A-6, A-8 and A-9, which have a chromium equivalent of from not smaller than 7.0 to not greater than 14, respectively.

Accordingly, the use of the alloy steels A-2 to A-10, which have alloying components falling within the scope of the present invention and a chromium equivalent of from not smaller than 5.0 to not greater than 16.0, and the predetermination of the content of retained austenite in the raceway surface to a range of from 6 to 25% by volume can provide a prolonged bearing life under lubrication with a traction oil and a good dimensional stability at high temperatures while keeping R/D ratio of the inner ring and outer ring to a range of from not smaller than 50.1% to not greater than 51.9%.

In other words, the arrangement of the structures of the test bearing Nos. 2 to 15 can provide a radial ball bearing for bearing the pulley shaft of a belt continuously variable transmission which undergoes little surface fatigue even with slippage and hence little dimensional change even with heat generation due to slippage while lessening center dislocation between the two pulleys round which the belt is wound to attain a prolonged bearing life under lubrication with a traction oil.

TABLE 3

| Material | Alloying component (wt-%) | | | |
|---|---|---|---|---|
| No. | C | Si | Mn | Cr |
| C-1 | 0.50 | 0.25 | 0.78 | 3.05 |
| C-2 | 0.55 | 0.50 | 0.51 | 4.01 |
| C-3 | 0.60 | 0.47 | 0.46 | 5.02 |
| C-4 | 0.65 | 0.30 | 0.78 | 5.98 |
| C-5 | 0.60 | 0.31 | 0.55 | 6.99 |
| C-6 | 0.80 | 0.28 | 0.49 | 4.03 |
| C-7 | 0.90 | 0.53 | 0.86 | 5.01 |
| C-8 | 0.61 | 0.99 | 0.51 | 4.01 |
| C-9 | 0.59 | 0.45 | 0.78 | 8.00 |
| D-1 | 1.01 | 0.25 | 0.31 | 1.47 |
| D-2 | 0.75 | 0.31 | 0.46 | 2.01 |
| D-3 | 0.58 | 0.48 | 0.55 | 8.95 |
| D-4 | 0.99 | 0.33 | 0.31 | 6.96 |
| D-5 | 0.62 | 1.45 | 0.35 | 5.03 |

Firstly, alloy steels C-1 to C-9 and D-1 to D-5 comprising alloying components having the formulation set forth Table 3 above were prepared. Table 3 also shows Cr equivalent of the various alloy steels. In Table 3, those having an alloying component content falling outside the range defined herein are underlined.

These alloy steels were each used to prepare an inner ring and an outer ring for radial ball bearing (inner diameter: 40 mm; outer diameter: 80 mm; width: 18 mm) having a nominal count of 6208. During this procedure, the radius Ri of curvature of the raceway 11 of the inner ring 1 and the radius Re of curvature of the raceway 21 of the outer ring 2 shown in FIG. 1 were each determined to various values.

The various alloy steels were each formed into a predetermined shape, and then subjected to (C) carburizing or carbonitriding, hardening and tempering or (D) only hardening and tempering (Through hardening) as heat treatment. In the heat treatment (C), the alloy steels were each heated to a temperature of from 930° C. to 960° C., subjected to carburizing or carbonitriding for 1 to 3 hours, subjected to soaking for 1 hour, and then subjected to oil hardening. Tempering was effected at a temperature of 160° C. In the heat treatment (D), the alloy steels were each subjected to hardening at a temperature of from 840° C. to 1,050° C. and tempering at a temperature of 160° C.

The alloy steels which had been subjected to heat treatment were each then subjected to grinding and superfinish. The surface roughness of the raceways 11, 21 were each determined to a range of from 0.01 to 0.04 μmRa.

Separately, balls 3 having a diameter (D) of 11.906 mm made of steel corresponding to grade 20 of SUJ2 were prepared. These balls 3 had been subjected to carbonitriding. These balls 3, the aforementioned inner ring 1, the outer ring 2 and a corrugated press retainer made of metal (not shown in FIG. 1) were then assembled into test bearings.

The characteristics of the various test bearings, i.e., "material", "C concentration of raceway (Carbon content-ratio)", "N concentration of raceway (Nitrogen content-ratio)", "[C+N] of raceway (total content-ratio of Carbon and Nitrogen)", "surface hardness of raceway", "residual γ (retained austenite content) of raceway", "radius (R) of curvature of raceway/diameter (D) of ball" of the inner ring 1 and the outer ring 2 are set forth in Table 4. The inner clearance in the radial is referred to as "C3 clearance".

10 samples were prepared for each of these test bearings. These samples were each mounted on a ball bearing life testing machine produced by NSK Ltd. These samples were each then subjected to life test by rotation under the following conditions.

Vibration was measured during rotation. When the amplitude of vibration of the bearing reached five times the initial amplitude of vibration, rotation was terminated. The rotation time thus reached was defined to be life. At this time, the bearing was examined for occurrence of flaking on the raceway of the inner and outer rings. In the case where the amplitude of vibration didn't reach five times the initial amplitude of vibration, testing was terminated when three times of the calculated life under these conditions, passed.

Subsequently, the results of test on 10 samples were plotted on a Weibull distribution graph (cumulative failure rate—life) for each of these test bearings. From this graph was then determined, beginning with those having short life, the total rotation time (L10 life) required until 10% of the samples of these test bearings underwent flaking. L10 life of the various test bearings were each then calculated relative to accounting life as 1.

<Conditions of Life Test>

Rotary speed: 3,000 rpm

Radial load: 4,800 N

Axial load: 2,000 N, 2 Hz ocillating

Lubricant: Mixture of a Type NS-1 lubricant for continuously variable transmission (produced by Showa Shell Sekiyu K.K.), which is classified as "traction oil" with 3% by volume of tap water Lubricant temperature: 130° C.

Rotary ring: Inner ring

The results of these tests are set forth in Table 4 below with the structure of the test bearings.

TABLE 4

| | | | Constitution of inner and outer ring of test bearing | | | | | | | Results of life test | | |
|---|---|---|---|---|---|---|---|---|---|---|---|---|
| | | | Surface concentration (wt %) | | | Surface hardness | Retained γ | R/D (%) | | L10 life | Number of flaking | |
| No. | Material | Heat treatment | C | N | C + N | (HRC) | (vol-%) | Inner ring | Outer ring | (relative value) | Inner ring | Outer ring |
| 26 | C-1 | Carburizing | 1.22 | 0.01 | 1.23 | 62.7 | 32 | 51.0 | 51.0 | 1.8 | 3 | 6 |
| 27 | C-2 | Carburizing | 1.56 | 0.01 | 1.57 | 63.1 | 30 | 51.0 | 51.0 | 2.4 | 1 | 3 |
| 28 | C-3 | Carburizing | 2.12 | 0.01 | 2.13 | 63.3 | 27 | 51.0 | 51.9 | 2.8 | 1 | 0 |
| 29 | C-4 | Carburizing | 2.23 | 0.01 | 2.24 | 63.2 | 25 | 51.0 | 51.9 | 3.0 | 0 | 0 |
| 30 | C-5 | Carburizing | 1.78 | 0.01 | 1.79 | 61.7 | 15 | 51.0 | 51.9 | 3.0 | 0 | 0 |
| 31 | C-6 | Carburizing | 1.68 | 0.01 | 1.69 | 63.3 | 28 | 50.1 | 51.9 | 2.1 | 7 | 0 |
| 32 | C-7 | Carburizing | 2.48 | 0.01 | 2.49 | 62.9 | 24 | 51.9 | 51.9 | 2.2 | 3 | 3 |
| 33 | C-8 | Carburizing | 1.20 | 0.01 | 1.21 | 60.9 | 17 | 51.9 | 51.9 | 2.2 | 5 | 2 |
| 34 | C-9 | Carburizing | 1.19 | 0.01 | 1.20 | 59.4 | 15 | 51.0 | 51.0 | 1.9 | 5 | 2 |
| 35 | C-1 | Carbonitriding | 1.13 | 0.11 | 1.24 | 62.9 | 35 | 51.0 | 51.0 | 2.0 | 1 | 5 |
| 36 | C-2 | Carbonitriding | 1.45 | 0.17 | 1.62 | 63.4 | 33 | 51.0 | 51.0 | 2.6 | 0 | 2 |
| 37 | C-3 | Carbonitriding | 1.89 | 0.19 | 2.08 | 64.0 | 28 | 51.0 | 51.0 | 3.0 | 0 | 0 |
| 38 | C-4 | Carbonitriding | 2.11 | 0.18 | 2.29 | 63.4 | 27 | 51.0 | 51.0 | 3.0 | 0 | 0 |
| 39 | C-5 | Carbonitriding | 1.75 | 0.22 | 1.97 | 62.8 | 23 | 51.0 | 51.0 | 3.0 | 0 | 0 |
| 40 | C-6 | Carbonitriding | 1.55 | 0.14 | 1.69 | 63.8 | 30 | 51.0 | 51.0 | 2.9 | 0 | 1 |
| 41 | C-7 | Carbonitriding | 2.28 | 0.19 | 2.47 | 63.3 | 28 | 51.0 | 51.0 | 2.7 | 1 | 1 |
| 42 | C-8 | Carbonitriding | 1.19 | 0.29 | 1.48 | 61.9 | 25 | 51.0 | 51.0 | 2.4 | 1 | 2 |
| 43 | C-9 | Carbonitriding | 1.21 | 0.22 | 1.43 | 60.1 | 18 | 51.0 | 51.0 | 2.5 | 1 | 2 |
| 44 | D-1 | Through hardening | 1.04 | — | 1.04 | 61.4 | 8 | 52.0 | 52.0 | 0.4 | 1 | 9 |
| 45 | D-1 | Through hardening | 1.04 | — | 1.04 | 61.4 | 8 | 50.1 | 51.0 | 0.2 | 10 | 0 |
| 46 | D-1 | Through hardening | 1.04 | — | 1.04 | 61.4 | 8 | 53.0 | 54.0 | 0.2 | 8 | 2 |
| 47 | D-2 | Carburizing | 1.20 | 0.01 | 1.21 | 62.9 | 33 | 51.0 | 51.0 | 0.8 | 1 | 9 |
| 48 | D-3 | Carburizing | 0.67 | 0.01 | 0.68 | 61.2 | 18 | 51.0 | 51.0 | 0.8 | 1 | 9 |
| 49 | D-4 | Carburizing | 1.91 | 0.01 | 1.92 | 61.9 | 17 | 51.0 | 51.0 | 0.5 | 4 | 6 |
| 50 | D-5 | Carburizing | 0.83 | 0.01 | 0.84 | 62.1 | 18 | 51.0 | 51.0 | 0.9 | 2 | 8 |
| 51 | D-2 | Carbonitriding | 1.17 | 0.13 | 1.30 | 63.2 | 35 | 51.0 | 51.0 | 0.9 | 1 | 9 |
| 52 | D-3 | Carbonitriding | 0.64 | 0.08 | 0.72 | 61.3 | 17 | 51.0 | 51.0 | 0.9 | 1 | 9 |
| 53 | D-4 | Carbonitriding | 1.78 | 0.16 | 1.94 | 62.2 | 19 | 51.0 | 51.0 | 0.6 | 4 | 6 |
| 54 | D-5 | Carbonitriding | 0.79 | 0.09 | 0.88 | 62.0 | 17 | 51.0 | 51.0 | 0.9 | 2 | 8 |

Figure 4:
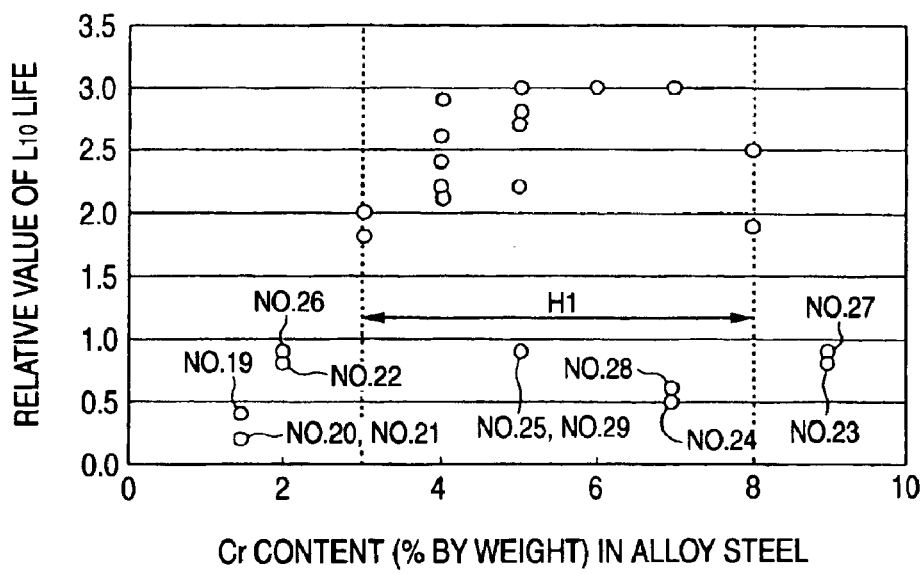
FIG. 4 is a graph illustrating the relationship between the chromium (Cr) content of alloy steels constituting the material and the life ratio (relative value of L10 life) obtained from the results of embodiment of implementation of the present invention.

The relationship between the chromium content in the alloy steels used in the inner ring and outer ring of the various test bearings and the resulting life ratio (relative value of L10 life) of these test bearings are graphically illustrated in FIG. 4. The relationship between the total content of C and N in the raceway of the inner ring and outer ring of the various test bearings and the resulting life ratio (relative value of L10 life) of these test bearings are graphically illustrated in FIG. 5.

Figure 5:
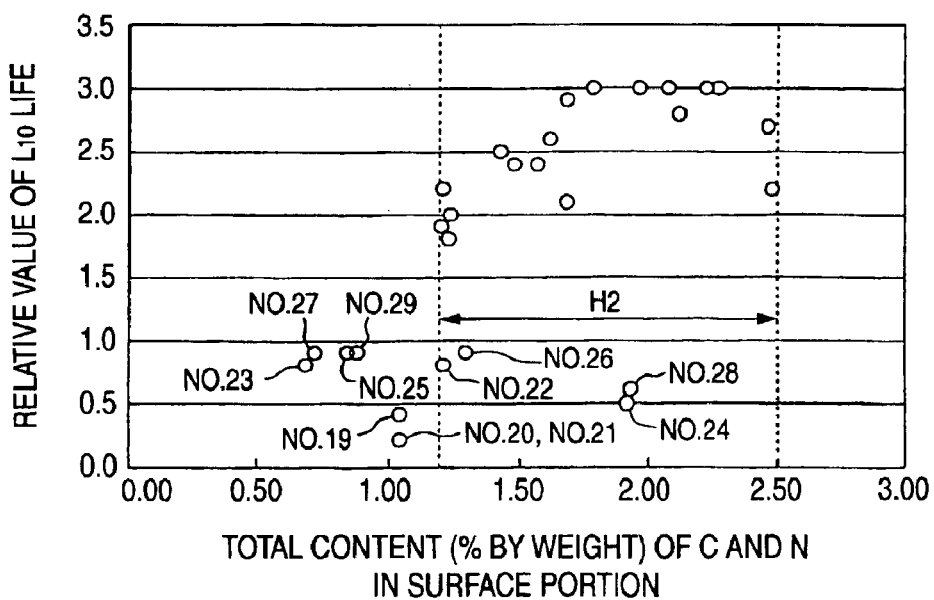
FIG. 5 is a graph illustrating the relationship between the total content of carbon (C) and nitrogen (N) in the raceway of the inner ring and outer ring and the life ratio (relative value of L10 life) obtained from the results of embodiment of implementation of the present invention.
Figure 6:
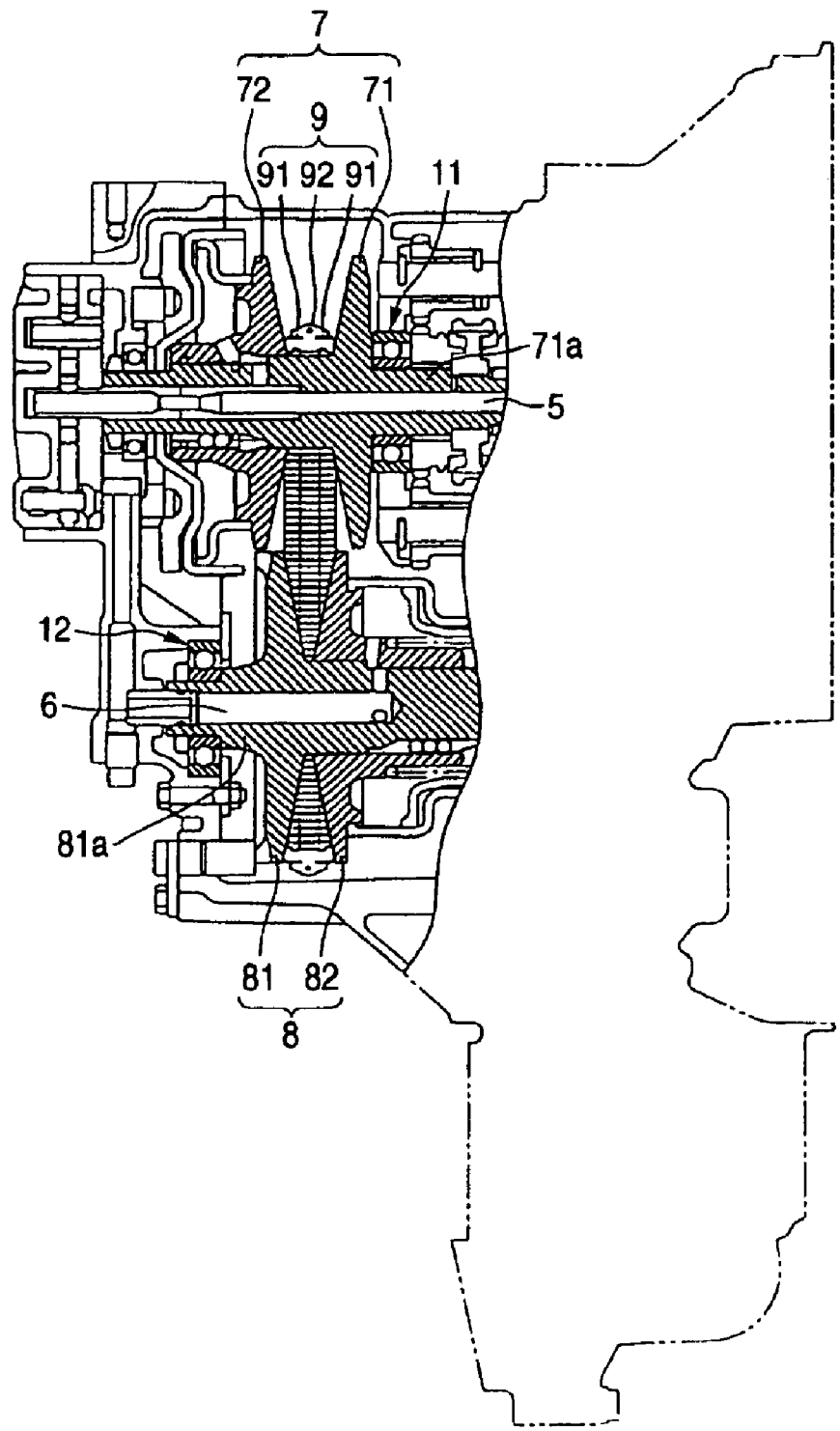
FIG. 6 is a sectional view illustrating an example of a belt continuously variable transmission for vehicle.
Figure 7A:
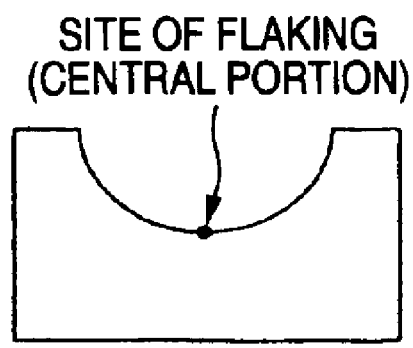
FIGS. 7A and 7B are diagrams illustrating how flaking occurs on the raceway wherein FIG. 7A indicates the case where the lubricant is a mineral oil and FIG. 7B indicates the case where the lubricant is a traction oil.
Figure 7B:
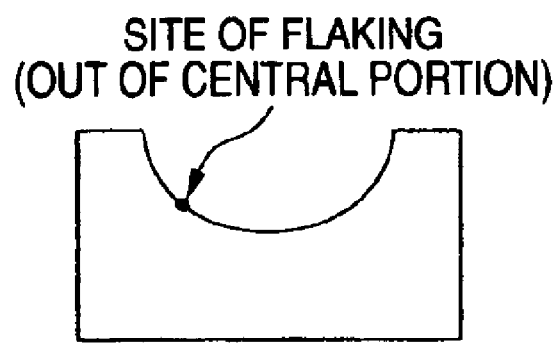

In FIG. 4, the range H1 indicates a range in which the content of Cr in the alloy steel falls within the range defined in the present invention (3.0 to 8.0% by weight). In FIG. 5, the range H2 indicates a range in which the total content of C and N in the raceway surface of the ring falls within the range defined in the present invention (1.20 to 2.50% by weight).

Further, the test bearings were kept at a temperature of 130° C. for 1,000 hours or more. The outer diameter of the bearings were measured before and after aging to measure the dimensional change thereof. The test bearing Nos. 26 to 43, which correspond to examples of the present invention, exhibited a negligibly small dimensional change.

As can be seen in these results, the test bearing Nos. 26 to 43 have R/D ratio of from not smaller than 50.1% by weight to not greater than 51.9% by weight both in the inner and outer rings but are made of the alloy steels C-1 to C-10, the alloying components of which fall within the scope of the present invention (requirement (1)), have C and N incorporated in the raceway surface of the ring in a total amount of from not smaller than 1.20% by weight to not greater than 2.50% by weight (requirement (2)) and retained austenite in the raceway surface of the ring in an amount of from 15 to 40% by volume (requirement (3)) and exhibit a raceway surface hardness of from not smaller than 59 to not greater than 64 as calculated in terms of HRC (requirement (4)). Thus, these test bearings can exhibit a prolonged bearing life when lubricated with a traction oil as compared with the test bearing Nos. 44 to 54, which don't satisfy any one of the aforementioned requirements (1) to (3).

Thus, the arrangement of the structures of the test bearing Nos. 26 to 43, the inner ring and outer ring of which fall within the scope of the present invention, can provide a radial ball bearing for bearing the pulley shaft of a belt continuously variable transmission which undergoes little surface fatigue even with slippage while lessening center dislocation between the two pulleys round which the belt is wound to attain a prolonged bearing life under lubrication with a traction oil.

In other words, in accordance with the present invention, the use of an alloy steel having a high chromium content and the enhancement of [C+N] in the raceway by carburizing or carbonitriding cause enhancement of texture stability and surface fatigue resistance, resulting in the prolongation of the life of rolling bearings which are used in environments subject to slippage. Further, the arrangement of the content of retained austenite in the raceway surface of the ring to a predetermined range makes it possible to secure desired heat resistance and dimensional stability even with increased generation of heat due to slippage and hence prolong life against seizing.

In particular, the test bearing Nos. 35 to 43 exhibited a raceway nitrogen concentration of from not smaller than 0.1% by weight to not greater than 0.3% by weight due to carbonitriding and thus exhibited a higher life ratio than the test bearing Nos. 35 to 44, which had been subjected to carburizing.

The test bearing Nos. 44 to 46 were obtained by subjecting D-1, which corresponds to the related art bearing steel, to Through hardening. These test bearings had different R/D ratios of inner ring and outer ring. The test bearing No. 45, which has an inner ring R/D ratio of 50.1%, and the test bearing No. 46, which has an inner ring R/D ratio of 53.0%, exhibited a shorter L10 life than the test bearing No. 45, which has an inner ring R/D ratio of 52.0% (0.2 times the calculated life). As can be seen in these results, in the case where the related art bearing steels are used, when R/D is predetermined to a range of from not smaller than 50.1% to not greater than 51.9%, the bearing life is reduced.

As mentioned above, in accordance with the present invention, the use of a specific alloy steel makes it possible to prolong the bearing life as compared with rolling bearings formed by the conventional alloy steels (bearing steel such as SUJ2, case hardening steel such as SCR420 and SCM420) even when lubricated with a traction oil and the radius (R) of curvature of the raceway on the inner ring and the outer ring is from not smaller than 50.1% to not greater than 51.9% of the diameter (D) of the balls.

In some detail, the predetermination of the radius (R) of curvature of the raceway of inner and outer rings to a range of from not smaller than 50.1% to not greater than 51.9% of the diameter (D) of the balls and the use of a specific alloy steel make it possible to provide a radial ball bearing for bearing the pulley shaft of a belt continuously variable transmission which can exhibit a prolonged bearing life while lessening center dislocation between the two pulleys round which the belt is wound.

Further, the arrangement of the structure of the present invention makes it possible to exert an effect of causing little surface fatigue even with slippage and hence little dimensional change with heat generation due to slippage, resulting in difficulty in occurrence of seizing, in addition to the aforementioned effect.

Moreover, in accordance with the belt continuously variable transmission of the present invention, the rotary shaft of the pulley round which the belt is wound is born by the rolling bearing of the present invention, making it possible to rotate the pulleys stably over an extended period of time while lessening center dislocation between the two pulleys and hence keeping the belt durable over an extended period of time.

As mentioned above, in accordance with the present invention, the use of a specific alloy steel and the arrangement of [C+N], retained γ and surface hardness of the raceway surface of the ring to predetermined range make it possible to lessen heat generation or surface fatigue due to metallic contact and make it difficult to produce a newly produced surface on the raceway. Thus, the bearing life can be prolonged as compared with rolling bearings formed by the conventional alloy steels (bearing steel such as SUJ2, case hardening steel such as SCR420 and SCM420) even when lubricated with a traction oil and the radius (R) of curvature of the raceway on the inner ring and the outer ring is from not smaller than 50.1% to not greater than 51.9% of the diameter of the balls.

In some detail, the predetermination of the radius (R) of curvature of the raceway of inner and outer rings to a range of from not smaller than 50.1% to not greater than 51.9% of the diameter (D) of the balls, the use of a specific alloy steel and the arrangement of [C+N], retained γ and surface hardness of the raceway surface of the ring to predetermined range make it possible to provide a radial ball bearing for bearing the pulley shaft of a belt continuously variable transmission which can exhibit a prolonged bearing life while lessening center dislocation between the two pulleys round which the belt is wound.

Further, in accordance with the belt continuously variable transmission of the present invention, the rotary shaft of the pulley round which the belt is wound is born by the rolling bearing of the present invention, making it possible to rotate the pulleys stably over an extended period of time while lessening center dislocation between the two pulleys and hence keeping the belt durable over an extended period of time.

What is claimed is:

1. A rolling bearing comprising:
   an inner ring;
   an outer ring;
   a plurality of balls as rolling elements rollably interposed between the inner ring and the outer ring,
   wherein the radius of curvature of the raceway on the inner ring and the outer ring is from not smaller than 50.1% to not greater than 51.9% of the diameter of the balls, and
   at least one of the inner ring, the outer ring and the rolling elements is obtained by forming an alloy steel having:
   a carbon (C) content of from not smaller than 0.50% by weight to not greater than 0.90% by weight;
   a chromium (Cr) content of from not smaller than 3.0% by weight to not greater than 90% by weight;
   a manganese (Mn) content of from not smaller than 0.10% by weight to not greater than 2.0% by weight;
   a silicon (Si) content of from not smaller than 0.10% by weight to not greater than 2.0% by weight;
   a molybdenum (Mo) content of zero or not greater than 2.0% by weight; and
   a vanadium (V) content of zero or not greater than 2.0% by weight, into a predetermined shape, and then subjecting the alloy steel to form hardening and tempering.

2. The rolling bearing according to claim 1, wherein the alloy steel has a chromium equivalent of from not smaller than 3.5 to not greater than 16.0 as represented by the following equation (1) and the content of retained austenite in the surface portion thereof after hardening and tempering is from not smaller than 6% by volume to not greater than 25% by volume:

$$\text{Chromium equivalent} = [Cr] + 2[Si] + 1.5[Mo] + 5[V] \quad (1)$$

wherein [M] represents the content (% by weight) of the element M.

3. The rolling bearing according to claim 2, which is used for the purpose of bearing a rotary shaft of a pulley, a belt of a belt continuously variable transmission being wound around the pulley.

4. A belt continuously variable transmission comprising a rolling bearing according to claim 2 by which a rotary shaft of a pulley is born, a belt being wound around the pulley.

5. The rolling bearing according to claim 1, which is used for the purpose of bearing a rotary shaft of a pulley, a belt of a belt continuously variable transmission being wound around the pulley.

6. A belt continuously variable transmission comprising a rolling bearing according to claim 1 by which a rotary shaft of a pulley is born, a belt being wound around the pulley.

7. A rolling bearing comprising:

an inner ring;

an outer ring; and a plurality of rolling elements rollably interposed between the inner ring and the outer ring, wherein at least one of the inner ring, the outer ring and the rolling elements is obtained by forming an alloy steel having:

a carbon (C) content of from not smaller than 0.10% by weight to not greater than 0.90% by weight;

a chromium (Cr) content of from not smaller than 3.0% by weight to not greater than 8.0% by weight;

a manganese (Mn) content of from not smaller than 0.10% by weight to not greater than 2.0% by weight; and a silicon (Si) content of from not smaller than 0.10% by weight to not greater than 1.0% by weight into a predetermined shape, and then subjecting the alloy steel to form carburizing or carbonitriding, hardening and tempering, the total content of carbon and nitrogen in the raceway surface of the ring and/or the rolling surface of the rolling element is from not smaller than 1.20% by weight to not greater than 2.50% by weight, the content of retained austenite in the raceway surface and/or the rolling surface is from not smaller than 15% by volume to not greater than 40% by volume, and the hardness of the raceway surface and/or the rolling surface is from not smaller than 59 to not greater than 64 as calculated in terms of Rockwell C hardness (NRC).

8. The rolling bearing according to claim 7, wherein balls as the rolling elements are provided and the radius of curvature of the raceway on the inner ring and the outer ring is from not smaller than 50.1% to not greater than 51.9% of the diameter of the balls.

9. The rolling bearing according to claim 8, which is used for the purpose of bearing a rotary shaft of a pulley, a belt of a belt continuously variable transmission being wound around the pulley.

10. A belt continuously variable transmission comprising a rolling bearing according to claim 8 by which a rotary shaft of a pulley is born, a belt being wound around the pulley.

* * * * *